(12) United States Patent
Nishimura et al.

(10) Patent No.: US 7,055,666 B2
(45) Date of Patent: Jun. 6, 2006

(54) ONE-WAY CLUTCH AND METHOD FOR MANUFACTURING CAGE FOR ONE-WAY CLUTCH

(75) Inventors: Seiji Nishimura, Fukuroi (JP); Hideki Oki, Fukuroi (JP); Tetsuya Wakamori, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 24 days.

(21) Appl. No.: 10/788,272

(22) Filed: Mar. 1, 2004

(65) Prior Publication Data
US 2004/0226798 A1    Nov. 18, 2004

(30) Foreign Application Priority Data
Mar. 3, 2003 (JP) ............................. 2003-055594

(51) Int. Cl.
F16D 41/07 (2006.01)
(52) U.S. Cl. .................................... 192/45.1
(58) Field of Classification Search ............... 192/45.1, 192/41 A, 110 R; 29/898.065, 898.067
See application file for complete search history.

(56) References Cited

U.S. PATENT DOCUMENTS 2,122,365 A * 6/1938 Beck .................... 29/898.065
2,202,792 A * 5/1940 Gothberg ............... 29/898.065
2,366,843 A * 1/1945 Dodge et al. ............... 192/45.1
2,657,106 A * 10/1953 Lovell et al. .......... 29/898.065
2,832,450 A * 4/1958 Wade ........................ 192/45.1
3,732,605 A * 5/1973 Scheifele ............... 29/898.065
4,635,770 A * 1/1987 Shoji et al. ................ 192/41 A
5,607,036 A * 3/1997 Costin ........................ 192/45.1

FOREIGN PATENT DOCUMENTS

| JP | 63-115637 | 5/1988 |
| JP | 1-40345 | 12/1989 |
| JP | 5-296266 | 11/1993 |
| JP | 5-94538 | 12/1993 |

* cited by examiner

Primary Examiner—Rodney H. Bonck
(74) Attorney, Agent, or Firm—Miles & Stockbridge P.C.

(57) ABSTRACT

The present invention provides a one-way clutch comprising sprags disposed between outer and inner races which are rotated relative to each other and adapted to transmit torque, spring members for biasing the sprags toward an engagement direction, and a cage which has a plurality of window portions for holding the sprags and in which a column portion between the adjacent window portions is partially cut at a predetermined position to connect between the adjacent window portions and the column portion is bent to form an elastic piece elastically engaging with the outer race or the inner race, and wherein a recessed portion is provided in a side surface of a bent portion of the elastic piece in a bent direction.

3 Claims, 3 Drawing Sheets

ONE-WAY CLUTCH AND METHOD FOR MANUFACTURING CAGE FOR ONE-WAY CLUTCH

BACKGROUND OF THE INVENTION

1. Field of the Invention

The present invention relates to an improvement in a one-way clutch used with a transmission of a motor vehicle, an agricultural machine, construction equipment, an industrial machine and the like, particularly an automatic transmission of a motor vehicle and performing a function such as back stop. Further, the present invention relates to a method for manufacturing a cage for holding a one-way clutch.

2. Related Background Art

In general, a one-way clutch used with an automatic transmission includes outer and inner races which are rotated relative to each other and is designed so that rotational torque is transmitted in only one direction by engaging sprags or rollers for transmitting torque between the outer race and the inner race with cam surfaces provided in a track face of the outer or inner race. Further, idle rotation is performed in a reverse direction.

In the one-way clutch of this kind, there is provided an annular cage having a plurality of window portions for holding the sprags as torque transmitting members. The cage is provided with elastic pieces so that desired drag is generated between the elastic pieces and the outer race by elastically engaging the elastic pieces with an inner periphery of the outer race, with the result that, immediately after the relative rotation between the outer and inner races changes from an idle rotation direction to an engagement direction, the sprags can transmit the torque between the outer race and the inner race.

FIGS. 5 and 6 show an example of a conventional cage having elastic pieces. FIG. 5 is an axial sectional view of the conventional cage and FIG. 6 is a partial enlarged view showing details of the elastic piece of FIG. 5. A substantially annular cage 24 is provided with a plurality of window portions 28 along a circumferential direction. A part of a column portion separating the window portion 28 from an adjacent window portion 28 is cut and bent radially outwardly to form an elastic piece 26.

As shown in FIG. 6, the elastic piece 26 includes two axial bent portions 29. The bent portions 29 are bent radially outwardly to afford desired dragging torque to an inner peripheral surface of an outer race.

In order to generate the dragging torque moderately, it is requested to design so that a repelling force of the entire elastic pieces has a desired value. To this end, there have been proposed (1) adjustment based on a bending amount of the elastic piece and (2) adjustment based on the number of elastic pieces.

The adjustment based on the bending amount to achieve the fact that the repelling force of the entire elastic pieces has the desired value is disclosed in Japanese Utility Model Application Laid-open No. 63-115637 (1988), Japanese Utility Model Publication No. 1-40345 (1989) and Japanese Utility Model Application Laid-open No. 5-94538 (1993), for example. Further, the adjustment based on the number of elastic pieces is disclosed in Japanese Utility Model Publication No. 1-40345 (1989). As a method for manufacturing a cage for holding the one-way clutch, a technique disclosed in Japanese Patent Application Laid-open No. 5-296266 (1993) is known.

However, in the above-mentioned conventional method, it was difficult to set the repelling force of the entire elastic pieces delicately. For example, in an arrangement in which a width of each column portion is great, the repelling force per elastic piece is great, with the result that, if the adjustment is performed on the basis of the number of elastic pieces, influence of each elastic piece will become too great. Further, also in an arrangement in which the width of the column portion is small, similarly, the delicate adjustment of the repelling force is limited.

SUMMARY OF THE INVENTION

Thus, an object of the present invention is to provide a cage for a one-way clutch in which a repelling force of an elastic piece can be set freely and drag between the cage and an outer race can be set with higher accuracy, and a method for manufacturing such a cage.

To achieve the above object, the present invention provides a one-way clutch comprising sprags disposed between outer and inner races capable of rotating relative to each other and adapted to transmit torque, spring members for biasing the sprags toward an engagement direction, and a cage which has a plurality of window portions for holding the sprags and in which a column portion between the adjacent window portions is partially cut at a predetermined position to connect between the adjacent window portions and the column portion is bent to form an elastic piece elastically engaging with the outer race or the inner race, and wherein a recessed portion is provided in a side surface of a bent portion of the elastic piece in a bent direction. Further, the present invention provides a method for manufacturing a cage for holding such a one-way clutch.

By providing the recessed portion in the side surface of the bent portion of the elastic piece in the bent direction, it is possible to set a sectional area of the bent portion freely, thereby setting a repelling force of the elastic piece voluntarily.

DESCRIPTION OF THE PREFERRED EMBODIMENTS

Figure 1:
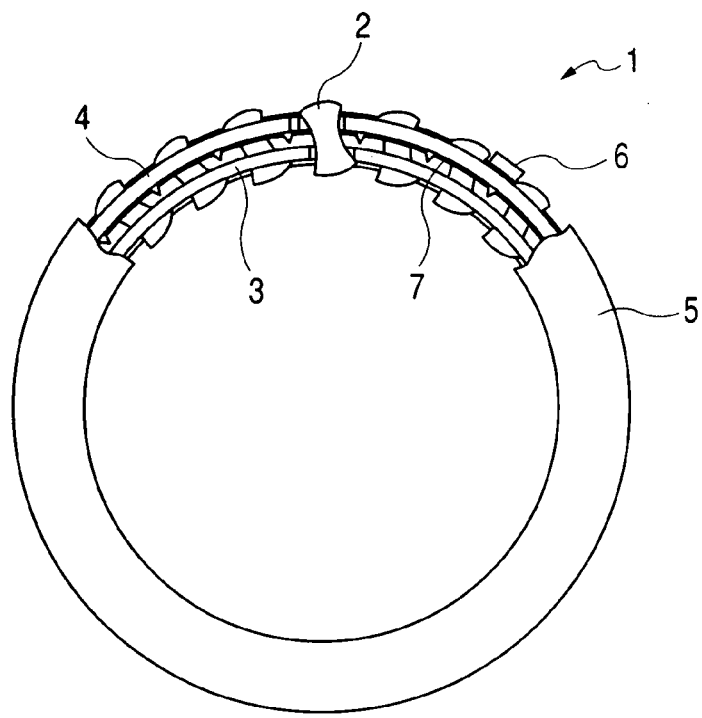
FIG. 1 is a partial fragmental front view of a one-way clutch according to an embodiment of the present invention.

Now, an embodiment of the present invention will be fully explained with reference to the accompanying drawings. Incidentally, in the drawings, the same elements are designated by the same reference numerals.

Figure 2:
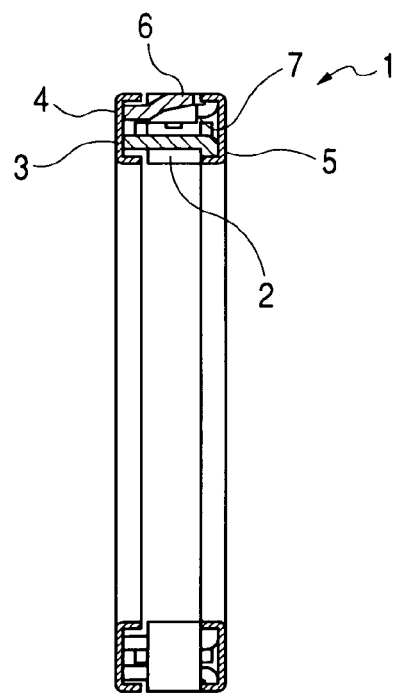
FIG. 2 is an axial sectional view of FIG. 1.

FIG. 1 is a partial fragmental front view of a one-way clutch according to an embodiment of the present invention and FIG. 2 is an axial sectional view of FIG. 1. A one-way clutch 1 comprises a plurality of sprags 2 disposed between outer and inner races (both are not shown) which are rotated relative to each other and adapted to transmit torque, spring member or ribbon springs 7 for affording rising moment to the sprags 2, i.e. for biasing the sprags toward an engagement direction with respect to a cam surface, and a cage having a plurality of window portions 8 (refer to FIG. 3) for holding the sprags 2. Since a column portion between the adjacent window portions 8 is partially cut at a predetermined position, the adjacent window portions 8 are connected to each other.

The cage comprises a substantially annular inner cage 3 and a substantially annular outer cage 4. The outer cage 4 is provided at its outer periphery with elastic pieces 6 obtained by bending the respective column portions and adapted to elastically engage with an inner peripheral surface of the outer race. Annular end bearings 5 are provided on both axial ends of the one-way clutch 1, thereby preventing the sprags 2 and the inner and outer cages 3, 4 from dislodging in an axial direction. Each end bearing 5 is provided at its radial both ends with axially extending flanges so that the bearing becomes slidable with respect to the inner and outer races (not shown) by means of the flanges, thereby maintaining the inner race and the outer race in a concentric condition.

Figure 3:
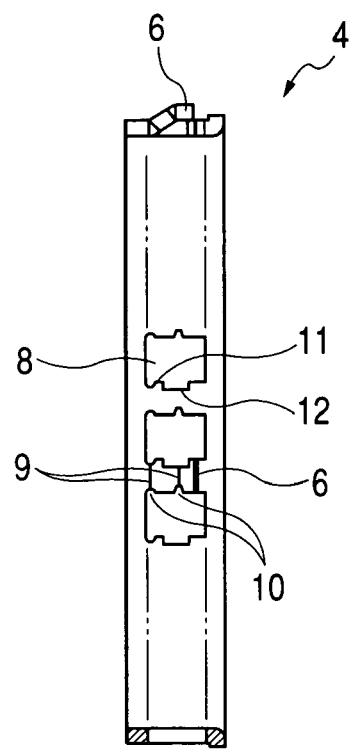
FIG. 3 is an axial sectional view showing a cage for holding the one-way clutch of the present invention.
Figure 4:
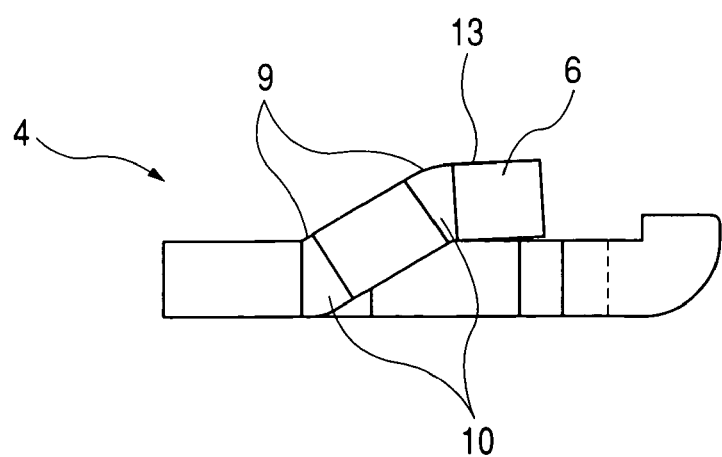
FIG. 4 is a partial enlarged view in FIG. 3, showing details of an elastic piece.
Figure 5:
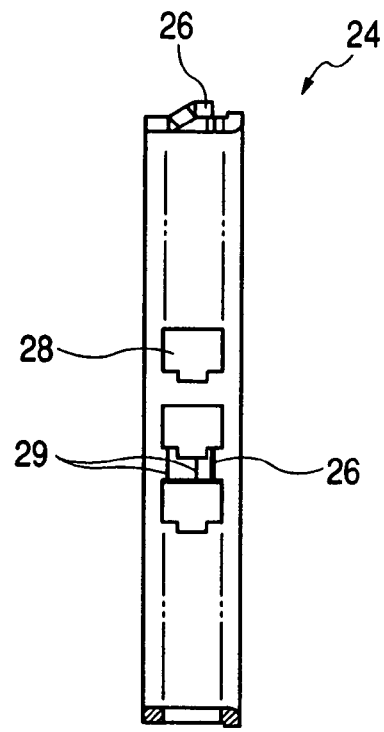
FIG. 5 is an axial sectional view showing a cage of a conventional one-way clutch.
Figure 6:
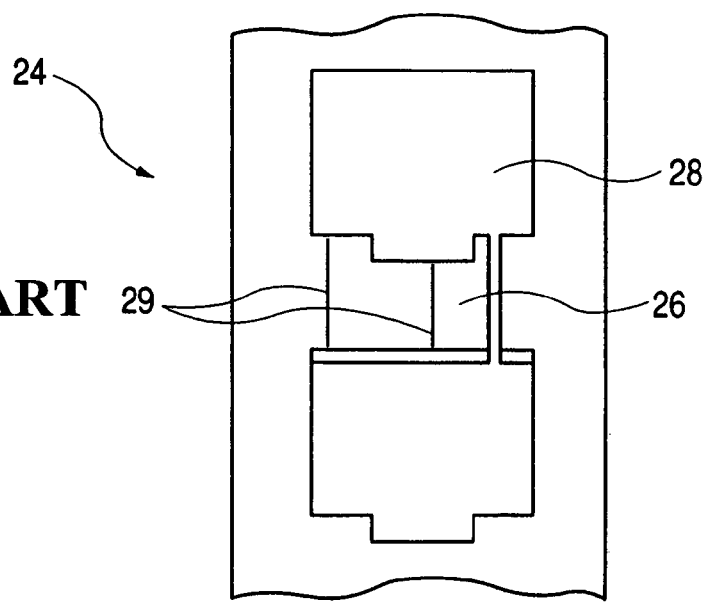
FIG. 6 is a partial enlarged view showing details of an elastic piece of FIG. 5.

FIG. 3 is an axial sectional view showing the cage of the one-way clutch of the present invention and FIG. 4 is a partial enlarged view of FIG. 3, showing details of the elastic piece 6. The plurality of window portions 8 of the outer cage 4 are provided at a predetermined interval along a circumferential direction of the outer cage 4. As shown in FIG. 3, two recessed portions cut into the column portion between the window portions are provided in one circumferential end surface of each window portion 8.

A protrusion extending from the column portion between the window portions into the window portion 8 is provide on the other circumferential surface of the window portion 8. A recess 12 within which a tab (not shown) of the spring 7 is engaged is provided in adjacent to the protrusion 11 in the axial direction.

As clearly shown in FIG. 4, the elastic piece 6 is cut from the column portion and is bent radially outwardly at positions of two bent portions 9. In the first bent portion 9, the elastic piece is bent radially outwardly at a great angle, and, in the position of the second bent portion 9, the elastic piece is bent so that an upper surface 13 of the elastic piece 6 is directed toward a substantially horizontal direction, i.e. becomes in substantially parallel to a cylindrical surface of the outer cage 4.

Two recessed portions 10 provided in one circumferential end of the elastic piece 6 are disposed at a side surface side in the bent direction in correspondence to the positions of the respective bent portions 9. Further, in the illustrated embodiment, the upper surface 13 of the elastic piece 6 is not completely in parallel to the cylindrical surface of the outer cage 4, but is slightly inclined with respect to the cylindrical surface. Accordingly, the elastic piece 6 is slidingly contacted with the inner peripheral surface of the outer race via a tip end of a free end of the upper surface 13 thereof. However, when the cage is assembled to the inner periphery of the outer race, the elastic pieces 6 are flexed, with the result that the entire upper surfaces 13 of the elastic pieces are slidingly contacted with the inner peripheral surface of the outer race, thereby generating predetermined dragging torque.

Although the elastic piece 6 is flexed around two bent portions 9 to generate a desired repelling force, by providing the recessed portions 10, flexing amounts of the bent portions 9 can be adjusted more minutely. Accordingly, desired dragging torque can be obtained.

Next, a method for manufacturing the cage of the one-way clutch according to the present invention will be explained with reference to FIGS. 3 and 4. The window portions 8 and the recessed portions 10 are formed by punching a substantially circular member. Then, the column portions are cut at predetermined positions. Lastly, the cut column portions are bent to form the bent portions 9, thereby forming the elastic pieces 6 shown in FIG. 4.

In a case where the cage is formed by the above-mentioned manufacturing method, although the recessed portions 10 are formed in the window portions 8 which do not include the elastic pieces 6 as shown in FIG. 3, since the bent portions 9 are formed with respect to the elastic pieces 6, the operation of the one-way clutch is not influenced.

The present invention is not limited to the above-mentioned embodiment and the following alterations and modifications can be made. For example, while the one-way clutch including the cage of dual type having the outer cage and the inner cage was explained, it should be noted that the present invention can be applied to a one-way clutch having a single cage.

Further, while an example that the outer cage includes the elastic pieces was explained, in an arrangement in which the sprags are slidingly contacted with the inner peripheral surface of the outer race during the idle rotation of the one-way clutch, the elastic pieces may be provided on the inner cage. In this case, the elastic pieces are bent radially inwardly to be slidingly contacted with an outer peripheral surface of the inner race.

According to the one-way clutch and the method for manufacturing the cage of the one-way clutch of the present invention as explained above, the following effects can be obtained.

By providing the recessed portions in the bent portions of the elastic pieces in the side surfaces in the bent direction, the cage of the one-way clutch in which the repelling force of the elastic piece can be set freely and the drag between the cage and the outer race can be set with higher accuracy, and the manufacturing method for manufacturing such a cage can be provided.

What is claimed is:

1. A one-way clutch comprising:
   sprags disposed between outer and inner races capable of rotating relative to each other and adapted to transmit torque;
   spring members for biasing said sprags toward an engagement direction; and
   a cage which has a plurality of window portions for holding said sprags and in which a column portion between adjacent window portions is partially cut at a predetermined position to connect between the adjacent window portions and said column portion is bent to form an elastic piece elastically engaging with said outer race or said inner race;
   wherein said elastic piece includes two bent portions, and a recessed portion is provided on a side of each bent portion adjacent to a window portion in a circumferential direction of said cage.

2. A one-way clutch according to claim 1, wherein said cage comprises an inner cage and an outer cage and said elastic piece is formed on said outer cage.

3. A one-way clutch according to claim 1, wherein said recessed portions are provided on a same side of said elastic piece.

* * * * *